March 9, 1965 — R. A. DARBY — 3,172,620
JET WING AND JET FLAP SYSTEM
Filed Jan. 17, 1962 — 6 Sheets-Sheet 1
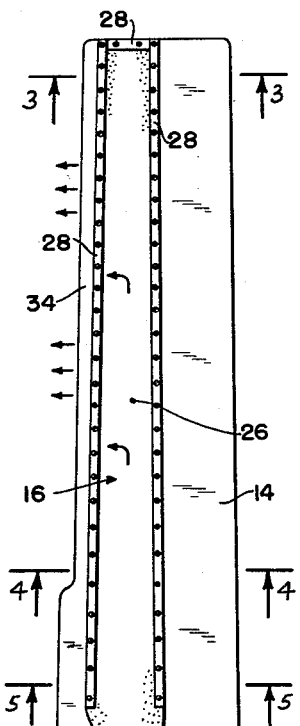
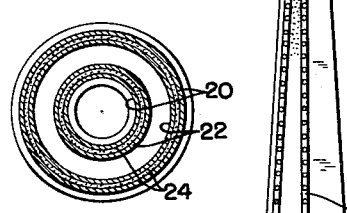
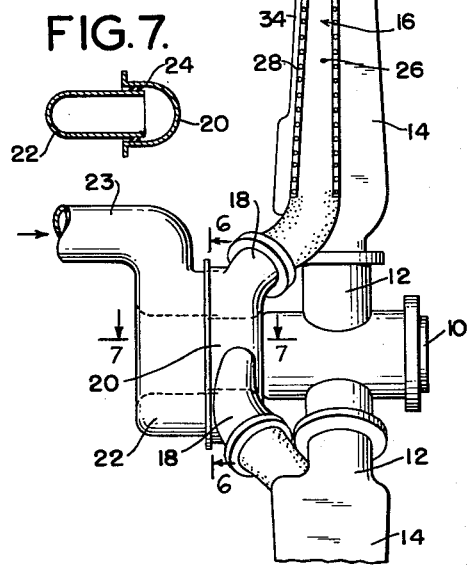
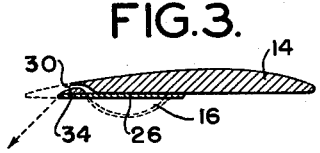
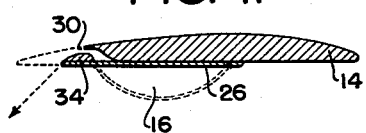
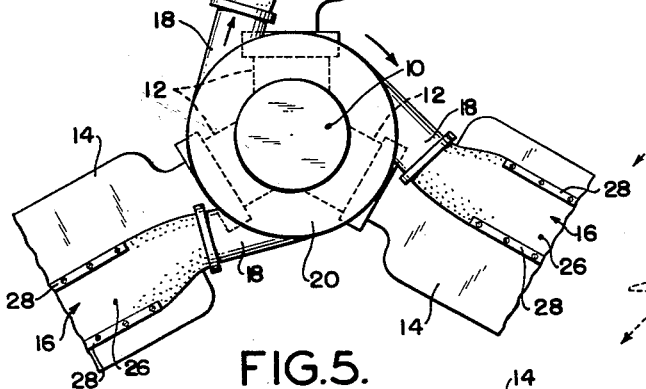
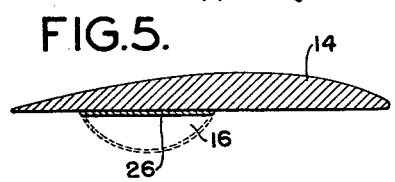
INVENTOR
ROBERT A. DARBY
BY
HIS ATTORNEYS

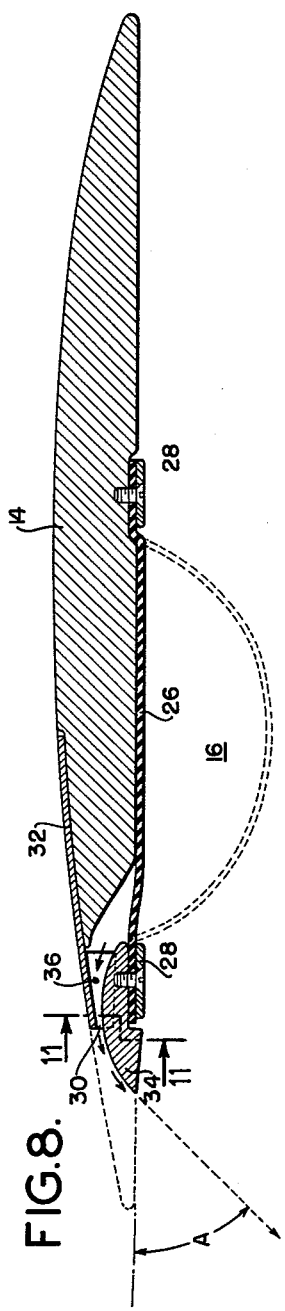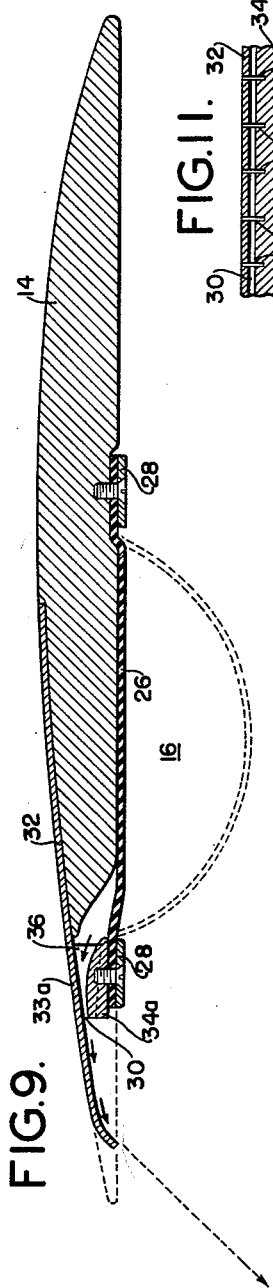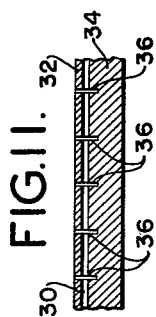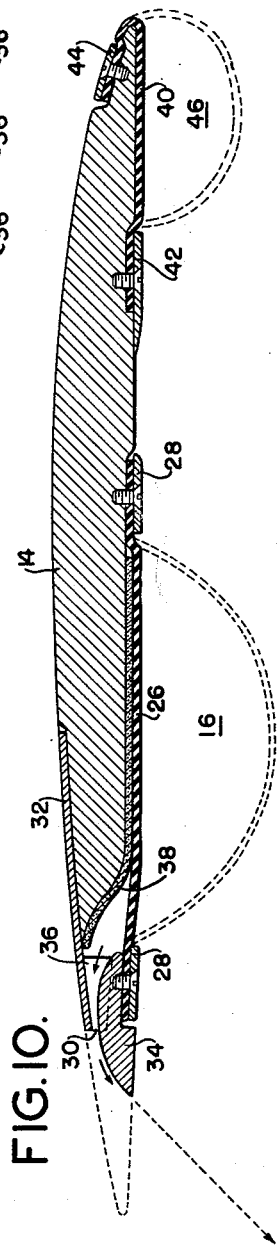

March 9, 1965  R. A. DARBY  3,172,620
JET WING AND JET FLAP SYSTEM
Filed Jan. 17, 1962  6 Sheets-Sheet 3
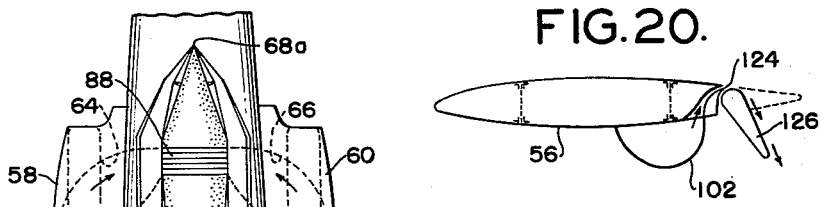
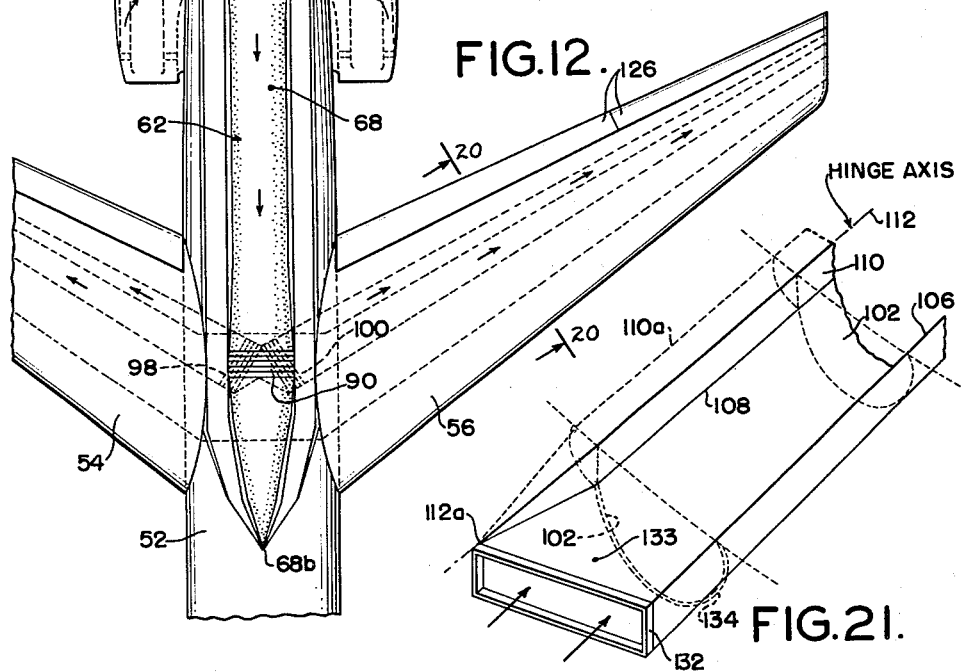
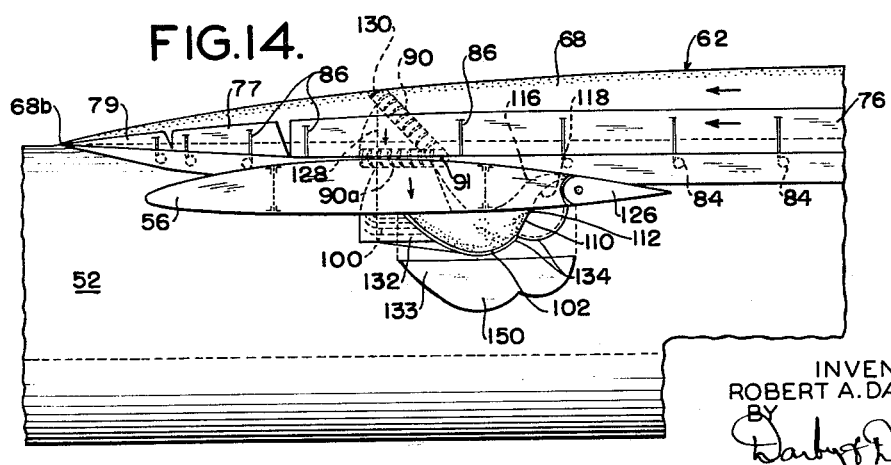
INVENTOR
ROBERT A. DARBY
BY
HIS ATTORNEYS March 9, 1965 R. A. DARBY 3,172,620
JET WING AND JET FLAP SYSTEM
Filed Jan. 17, 1962 6 Sheets-Sheet 4

INVENTOR
ROBERT A. DARBY
BY
HIS ATTORNEYS

INVENTOR
ROBERT A. DARBY
BY
HIS ATTORNEYS

March 9, 1965 R. A. DARBY 3,172,620
JET WING AND JET FLAP SYSTEM
Filed Jan. 17, 1962 6 Sheets-Sheet 6
FIG. 22
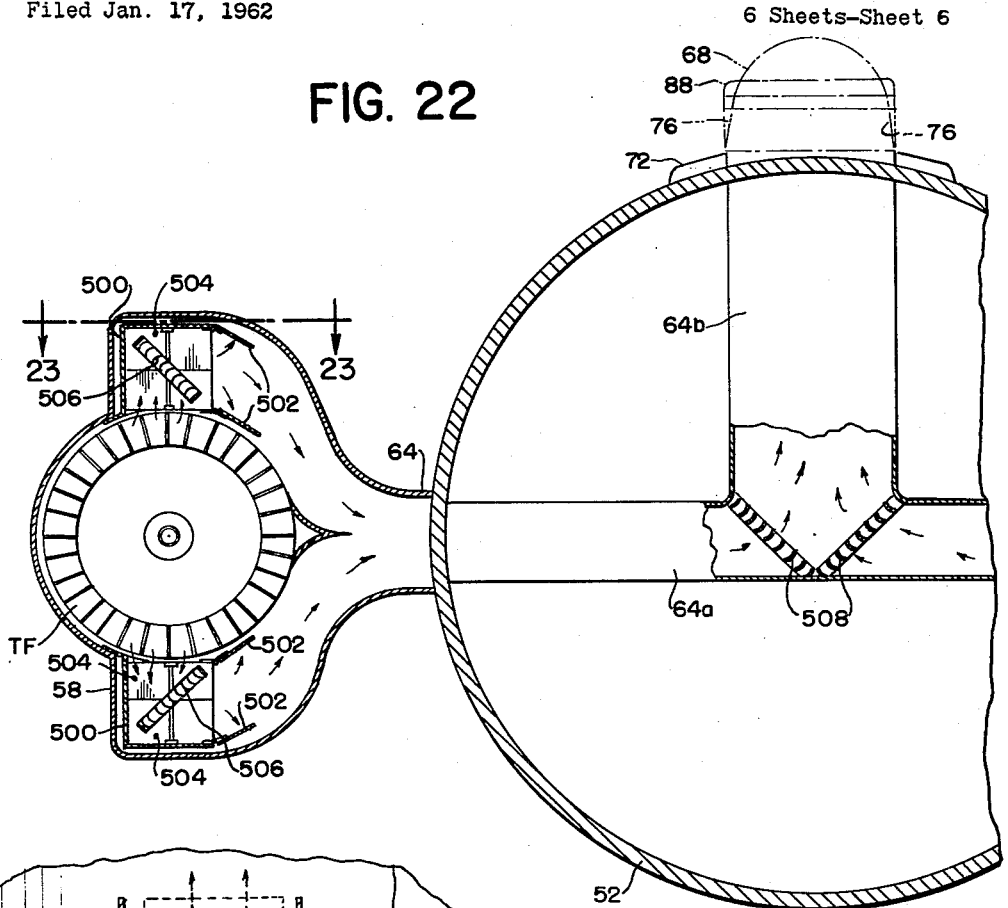
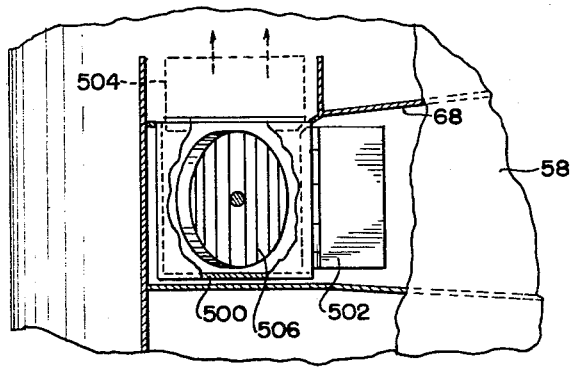
FIG. 23
INVENTOR
ROBERT A. DARBY
BY
ATTORNEYS United States Patent Office 3,172,620
Patented Mar. 9, 1965

3,172,620
JET WING AND JET FLAP SYSTEM
Robert A. Darby, Bellevue, Wash., assignor to Fairchild Hiller Corporation, a corporation of Maryland
Filed Jan. 17, 1962, Ser. No. 166,845
2 Claims. (Cl. 244—42)

The present invention relates to novel structural systems for using the principle of the "jet flap" or jet-augmented flap in connection with the wings of an airplane or with the propeller(s) of an airplane or air propellers used on a hydrofoil watercraft.

More particularly, the invention involves the use of external distinsible air ducts in connection with the jet wing of an airplane or air propellers for aircraft, hydrofoil watercraft or other vehicles requiring high thrust.

The principle has been known for some time that the downward and aft ejection of high velocity air of sufficient quantity from a narrow slot or elongated nozzle at the trailing edge of an airfoil, such as a wing or propeller blade, can produce very high lift coefficients. The sheet of air so ejected has been referred to in the art as a "jet flap"; when applied to the wing of an airplane, the airplane has sometimes been referred to as a "jet wing airplane" and the wing as a "jet wing." In accordance with this invention means are provided to convey, or duct, large weight flows of air to the slot along the airfoil trailing edge, and to vary the angle of the jet sheet with respect to the airfoil chord. In the case of a wing, a deflectable plain flap is employed to vary the angle of the jet sheet by causing the ejected jet sheet to impinge tangentially on the flap leading edge. In that case the jet sheet adheres to the upper surface of the flap and leaves its trailing edge at the angle that that surface has with respect to the airfoil chord plane. In the case of a propeller blade, no movable flap is used, the angle of the jet sheet to the profile chord being achieved by a unique construction of the propeller blade, as will hereinafter be explained in full detail, and remaining fixed at any combination of r.p.m. and forward speed.

Usually the jet flap is employed over the full span of a wing, but on a propeller blade it may be advantageous to restrict it to only a portion of the radius, as from, say, 0.2 radius to 0.7 radius. Whether or not full-span or partial-span slots be used the effectiveness of the jet flap depends chiefly upon very large weight flows of air being ducted to and discharged from the slots. Mechanical provision for forming ducts of ample cross-section constitutes the chief part of this invention. High-speed wings and propeller blades necessarily have thin profiles which preclude the fitting of internal ducts of sufficient cross-section to deliver the air required for the jet flap without excessive power loss in the ducts. With the present invention ducts are provided external to the airfoils, and these ducts can have ample cross-section regardless of the thinness of the airfoil to which they are attached.

While the external distensible duct on an airfoil is the main part of this invention, an external distensible duct running fore and aft on the top, bottom or sides of an aircraft fueslage, to convey air to wing ducts or to other devices, is also a part of the invention.

Broadly speaking, the invention includes, in the application of the jet flap principle, the use of external distensible air ducts extending along and over airfoil surfaces, either wings or propeller blades, and over fuselages. These ducts collapse and merge with the airfoil undersurface or fuselage for regimes of operation (cruise and high speed) when very high lift coefficients are not required. For those regimes of operation requiring very high lift coefficients (take-off, landing and very low-speed flight, in the case of an aircraft; and take-off, in the case of a hydrofoil watercratf) the ducts of the present invention distend under the pressure of the air for the slots and produce an ample delivery cross-section entirely external to the normal airfoil profile or fuselage cross-section. When collapsed the duct has no aerodynamic effect upon the normal airfoil profile, and when distended the magnitude of the jet sheet, or jet flap, and the near-stagnation pressure in the flow field in the vicinity of the duct make the effect of the external distended duct entirely negligible so far as aerodynamic forces on the airfoil are concerned. The aerodynamic forces produced by a distended duct along a fuselage are negligible at low speeds.

The many detailed objects of this invention will be apparent from the following detailed disclosure of means by which the jet sheet is provided for air propellers and airplane jet wings.

In the accompanying drawings,

FIGURE 1 is a plan view of one blade and the hub of a three-bladed propeller showing the manner in which the external distensible air duct, on the blade, is supplied with air from a compressor or blower fixed to the aircraft (or other vehicle) and communicating with the propeller through an air-tight slip-joint;

FIGURE 2 is a side elevational view of the structure of FIG. 1;

Figure 19:
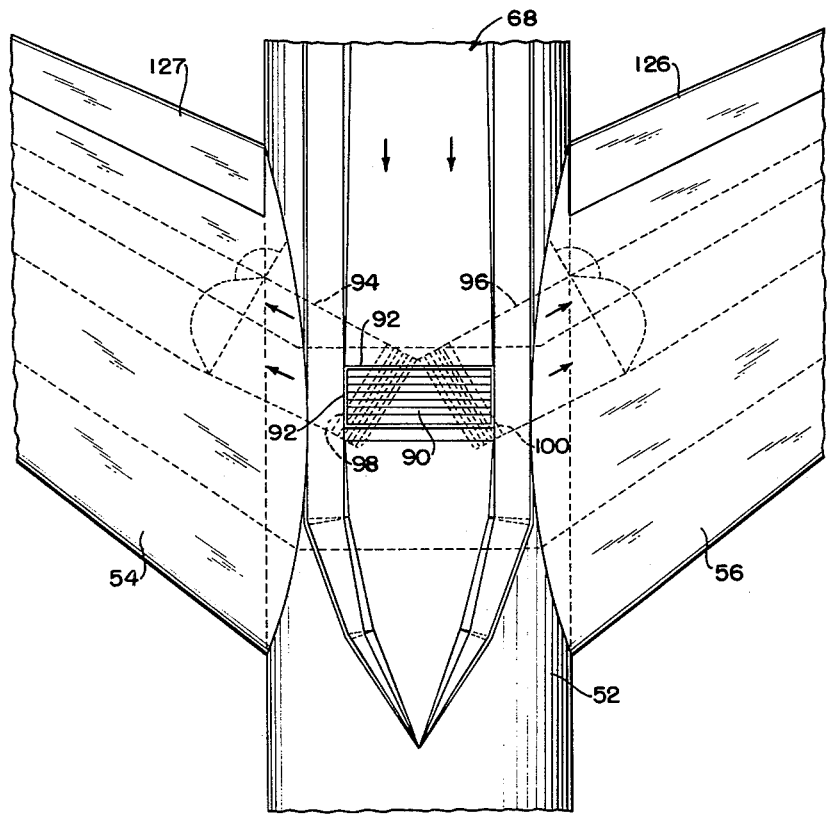
Figure 13:
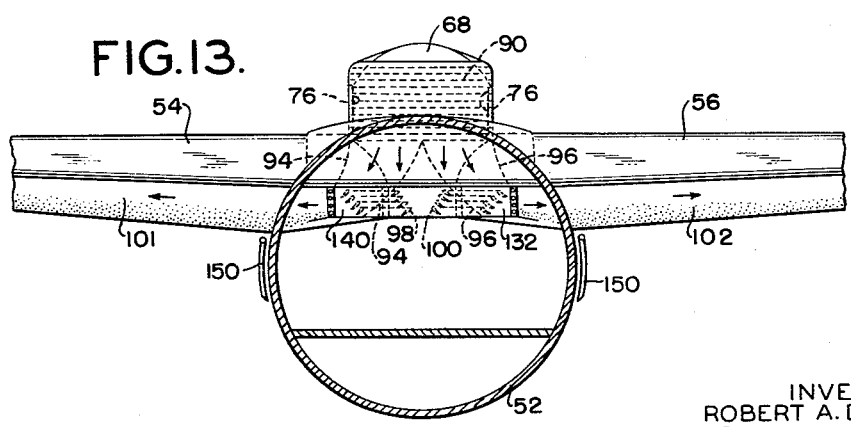
Figure 15:
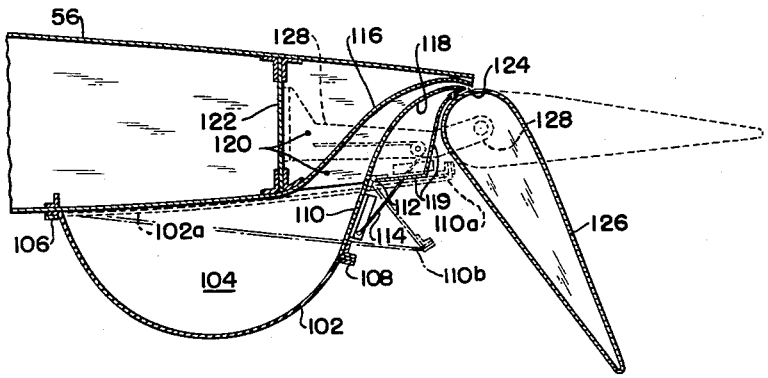
Figure 16:
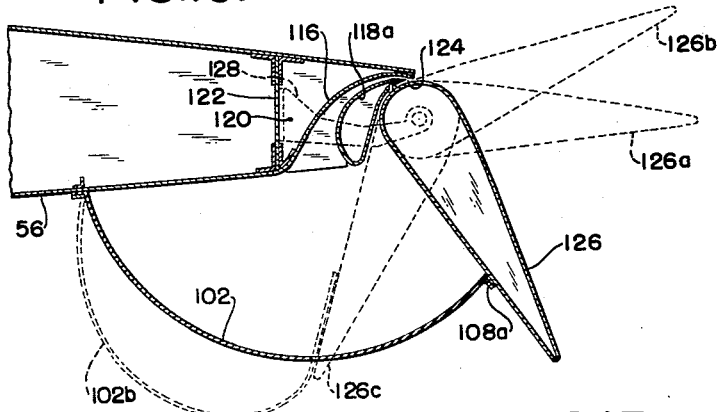
Figure 18:
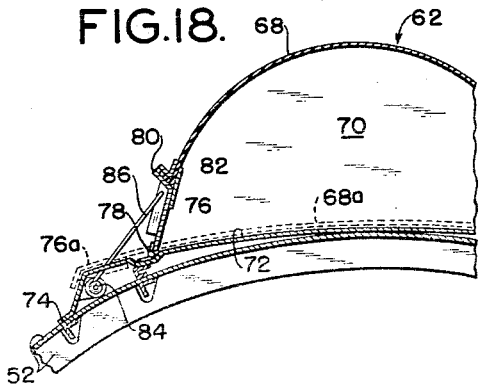
Figure 17:
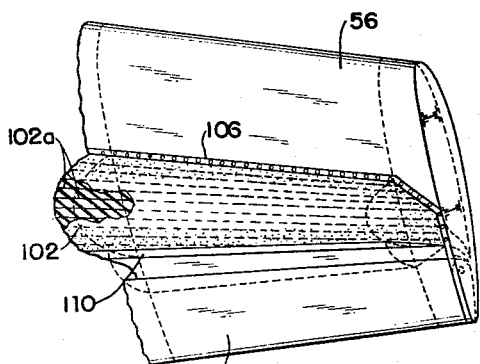

FIGURES 3, 4 and 5 are cross-sectional, diagrammatic views taken approximately on the lines 3—3, 4—4 and 5—5, respectively, of FIG. 1;

FIGURES 6 and 7 are detailed structural views of the slip-joint taken on the lines 6—6 and 7—7, respectively, of FIG. 2;

FIGURES 8, 9 and 10 are enlarged cross-sectional views showing the actual construction of a blade assembly such as shown in FIG. 1 and corresponding respectively to the diagrammatic views of FIGS. 3, 4 and 5;

FIGURE 11 is a cross-sectional view taken on the line 11—11 of FIG. 8;

FIGURE 12 is a top plan view, showing schematically the overall duct system for a jet wing airplane using by-pass air from aft-mounted turbofan engines to blow the wing slots and produce the jet sheet or flap;

FIGURE 13 is a diagrammatic end elevational view of the structure of FIG. 12, showing the fuselage in cross-section;

FIGURE 14 is a righthand side elevational view of the structure of FIG. 12, showing the root of the wing in cross-section;

FIGURE 15 is a vertical, transverse, cross-sectional view through the aft edge of one of the wings of the structure of FIG. 12, showing the external ducting inflated;

FIGURE 16 is a view similar to that of FIG. 15, showing a modified structure for mounting the sheet providing the distensible duct;

FIGURE 17 is a perspective view from the underside of a wing tip showing the manner of closing off the collapsible duct at the outer end of the wing;

FIGURE 18 is a portion of a vertical, tranverse, cross-sectional view of a typical section of the main collapsible duct extending along the top of the fuselage;

FIGURE 19 is a fragmentary top plan view of an airplane fuselage and its sweptback wings illustrating diagrammatically the ducting by means of which high-velocity air, as the by-pass air of a turbofan power plant, is supplied to external distensible air ducts on the lower surfaces of the wings, the turbofans being mounted at the rear of the fuselage;

FIGURE 20 is a diagrammatic illustration of a cross-section of one of the wings taken on the line 20—20 of FIG. 12;

FIGURE 21 is a fragmentary perspective view illustrating the manner of connecting one of the distensible wing ducts to the solid main duct at the fuselage end of the wing;

FIGURE 22 is a cross-sectional view through one of the engine nacelles and the fuselage of the plan of FIG. 12, showing diagrammatically the duct for transferring by-pass air from the turbofan of the power plant to the extensible duct system; and FIGURE 23 is a detailed cross-sectional view taken on the line 23—23 of FIG. 22.

Broadly speaking, the subject matter of this invention is concerned with a practical application of the principle of using a sheet of air, or jet flap, to increase the coefficient of lift of airfoils of which an airplane wing and an airplane propeller are examples. Structural assemblies by means of which this can be accomplished in each case are disclosed herein in detail and will be discussed separately. As will appear from this disclosure, various sources of air in sufficient volume and pressure for these purposes may be used to supply a so-called "jet-wing" or "jet flap."

Common to the application of this subject matter to airplane wings and propellers is the provision of a collapsible duct system for supplying air to either the wings or the propeller blades, or both, of an airplane, or to the blades of an air propeller on a hydrofoil watercraft.

The structure as applied to airplane propellers will first be described in connection with FIGS. 1 to 11, inclusive. This structure is intended primarily for use on propellers which must produce great thrust at low forward speed, but which may not have more than ordinary diameter. VTOL airplanes and hydrofoil craft (which experience very high drag at hump speed) are two classes of vehicle requiring such propellers. The jet flap propeller will, at equal diameter, produce higher static thrust than a conventional propeller, while maintaining high cruise efficiency, in the order of 80–85 percent, at speeds approaching 400 knots.

The structure includes a hub assembly 10 which includes supporting fixtures 12 for the inner ends of the propeller blades 14 of which there are three in the case of the propeller illustrated. The blades 14 can be of the variable pitch type, if desired. These elements are mounted upon a propeller shaft, not shown, driven of course by means of a suitable power plant. The propeller blades may be of any type construction such as aluminum alloy slab, hollow steel, wood or composition. As is apparent, practically no change in the basic cross-section of the blades is required in providing them with a jet flap profile. At 16 is generally indicated the external distensible air ducts for supplying air to the trailing edge slot, here shown as extending from station 4—4 outward to the blade tip. As previously mentioned, these limits can be different, as the design may require.

The ducts 16 are formed by a distensible sheet 26 which extends longitudinally of the propeller blade 14 and is attached along its edges by means of strips 28. One strip is shown secured to the blade body (FIG. 8) while the other strip is secured to the flap block 34. The flap block 34 is secured to the blade 14 by means of an attaching plate 32 secured to the blade in any suitable manner. These parts and particularly the distensible sheet 26 are mounted so that they are easily replaceable. The forward edge of the flap block and the rear face of the blade are contoured to form a converging slot opening at the rear edge of plate 32 (FIG. 8) and providing a discharge nozzle 30 extending along the flap block 34. A series of separators 36, spaced along the nozzle slot 30, form part of the assembly comprising the plate 32 and flap block 34 to attach the flap block 34 to the plate 32 and also to control the spanwise (radiuswise) distribution of air to the slot 30.

All these parts may be applied to the blade without substantially modifying its airfoil contour. To aid in this, the blade is routed out at the righthand edge of the sheet 26 so that the attached sleeve 28 falls within the contour of the blade. Similarly, the blade is routed out to receive the supporting plate 32. The nozzle assembly comprising the plate 32, separators 36, and the flap block 34 can be built as a unit, that is, a fixed assembly easily attachable to the blade.

The curvature or terminal angle of the flap block 34 with the airfoil chord determines the flap jet angle A. The jet sheet issuing from the nozzle 30 in FIG. 8 adheres strictly to the surface of the flap block whatever its curvature, so long as relationships well understood in the art of aerodynamics are observed between jet velocity and the curvature of the flap block. It will be noticed that the forward surface of the flap block and the rear face of the blade form a converging supply duct to the slot or nozzle 30. The rear edge of plate 32 can be extended aft to form a convergent-divergent nozzle, if desired. Whatever variations in the details of the nozzle and flap block are made, the resulting effective truncation of the airfoil section of the blade is intended to be so slight as to cause no marked deleterious effect on the propeller cruise efficiency, when the nozzles are not blowing.

FIG. 9 shows an alternative nozzle assembly, the purpose of which is to make the trailing portion of the jet flapped blade less bluff and more in conformance with the basic airfoil contour. This is accomplished by extending the support plate 32a further aft and changing the contour of the flap block 34a, as illustrated.

Air under pressure is supplied to the duct 16 (FIGS. 3, 4) formed by the blade above and the distended membrane below, from a housing having a slipjoint and comprising the relatively rotatable portions 20 and 22; see FIGS. 2, 6 and 7. The housing portion 20, turning with the propellers, is provided with lateral tubular extensions 18 for connecting to the inner ends of the ducts formed by the sheet 26, which have tubular ends, as shown, for connection therewith in any suitable manner. Sealing rings 24 are interposed between the housing parts 20 and 22 to provide a fluidtight slipjoint in one suitable form.

The housing part 22, fixed to the aircraft or other vehicle, is provided with supply connection 23 by means of which air under pressure from any suitable source can be supplied to the ducts 16 to cause sheet 26 to distend, as shown in dotted lines in FIGS. 3, 4, 8 and 9. The sheet 26 is fastened down at its outer end, that is, at the tip of or well out on each propeller blade, as shown in FIG. 1, to insure that all fluid supplied to each duct will be discharged circumferentially from the nozzle 30 of each blade.

When the supply of pressure air to the ducts 16 is removed, the sheets 26 collapse against the faces of the respective blades, as shown by full lines in FIGS. 8 and 9. This is the position of the sheets in all regimes of flight other than take-off, landing and very slow speeds. The air under pressure can be supplied, as will appear hereinafter, by a compressor in the aircraft.

The sheets 26 are preferably of an air-impervious material, or structure, elastic but possessing a high strain, or deformation per unit of length. In other words, the material must stretch under hoop tension resulting from air pressure in the duct 16 and still snap back to original length when the pressure is taken off the duct. A rubber de-icer boot, well known in the art, has the desired property. De-icer boot material, however, may require modification to permit more chordwise stretch for a given pressure, for this application, depending upon the compressor employed. Any substantial elongation of the material of sheets 26 must be confined to the chordwise, or circumferential, direction and kept out of the radial direction. If sheets 26 are some type of rubber, fine steel wires such as 102a for example, see FIG. 17, can be molded into the rubber lengthwise of the blade, as in the similar case of sheet 102, and the ends anchored under the clamping strips.

As those skilled in the art will understand, the duct 16 when sheet 26 is distended will not be sensed by the blowing airfoil.

When the duct 16 is deflated (in cruise) the pressure field round the blade profile is such that the sheet 26 should be pressed snugly against the blade 14. If the natural pressure were for any reason found inadequate to insure this snug, flush contact, a weak vacuum could be applied to the duct system at the inlet 23.

The compressed air supplied to the distensible ducts can, for example, be derived by bleeding the compressor of the turboprop power plant of the airplane, or from any other suitable compressor. The temperature of the air could be as high as 300° F. unless it is passed through an inter-cooler. In cases where such temperatures might prove undesirable because of blade distortion due to expansion, the structure of FIG. 10 can be used. In FIG. 10 the rear part of the blade structure is the same as that of FIG. 8 with the exception that a layer of suitable insulating material 38 has been affixed to the face of the blade 14 exposed to the distensible sheet 26. This will serve to insulate the blade body from the heated air being delivered to and discharged from the nozzle 30.

Another feature of this invention is also illustrated in FIG. 10 in association with the leading edge of the propeller blade. In this feature a sheet of fabric 40 similar to the fabric 26 is attached over the leading edge of the blade by strips 42 and 44, as shown. The space behind the sheet 40 is connected to the space behind the sheet 26, as for example by means of a duct or even a passage through the blade so that when compressed air is supplied to the duct 16, it will also be supplied behind the sheet 40 to cause it to distend to form an enlarged pocket 46, extending lengthwise of the blade, as shown in FIG. 10. The purpose of this pocket, in addition to the possible function of serving as a pneumatic de-icing boot, would be to prevent blade stall or the formation of a vortex, as will be understood by those skilled in the art, over the back of the blade. In the use of a jet flap airfoil there sometimes occurs the problem of separation of the flow at its leading edge. Usually the separated flow reattaches to the jet sheet causing a vortex to be trapped over the back of the airfoil. In situations where this vortex exists and is stable no difficulty normally arises. However, it is known that increasing the radius of curvature of the airfoil leading edge is effective in preventing, or delaying, leading edge separation. It is for this reason that the distended pocket 46 is provided, to produce a bulbous leading edge of generous radius. This formation is effective on thin airfoils and can be provided on jet flap propellers, as explained, or on a thin wing.

The structure disclosed in FIGS. 12 to 21 inclusive illustrates, an application of the same principles to provide a jet-augmented flap or jet flap for substantially increasing the lift of the wing. In FIG. 12 the central section 52 of the fuselage of a turbofan airplane, as illustrated, is provided with a pair of swept wings 54 and 56. As illustrated, this airplane is provided with turbofan or other bypass type engines in nacelles 58 and 60. The bypass air is delivered by ducts 64 and 66 to the aft end of a distensible duct system 62 extending along the top of the fuselage. As will be explained later, this duct system tapers down to the aft point 68a from the forward point 68b.

A structure for forming the main duct assembly 62 is illustrated in some detail in the cross-sectional view of FIG. 18. In this case the fuselage structure 52 is provided on the top with a convex plate 72 which runs along the top of the fuselage and is secured thereto at its edges, as indicated at 74. Mounted on top of the plate 72 and extending along the sides is an articulated plate system 76, 77 and 79 (see FIGS. 14 and 18) which plates are connected by means of hinges 78 to the plate 72. The plate 76 is generally rectangular in form while the plates 77 and 79 taper down at a point, as shown, to the terminal forward end 68b of the duct system. A similar construction is provided at the aft end of the duct system terminating at the point 68a, FIG. 19.

Secured along the top edges of the plates 76, 77 and 79 is an impervious distensible sheet 68 which forms, with the plate 72, an external duct 70 lying along the top of the fuselage. The sheet 68 is secured to the plates as indicated at 80 to form an airtight joint and the hinges 78 are made as airtight as possible. Mounted within the spaces between the skin of the fuselage and the plate 72 along its sides are a series of servo motors or winches 84 connected by cables 86 secured to the plates 76, 77 and 79. See also FIG. 14. Winches are also provided for the plates at the other end of the duct system corresponding to the plates 77 and 79.

A flexible sealing strip 82 may be provided to extend along the joint between the plates 76 and the sheet 68 to better seal the joint against escape of compressed air. It is of course apparent that the construction at the other side of FIG. 18 is the same as that illustrated.

When the winches are energized to reel in the cable 86, the plates 76, 77 and 79 swing down into the position shown at 76a for the plate 76, drawing the distensible sheet 68 down tight across the platform 72, as shown at 68a. This is the condition when the duct system is not in use. As previously suggested for the propeller, a source of suction could be provided, if necessary, behind the sheet in the position 68a to cause it to cling more tightly to the platform 72. For example, suction could be created in the triangular spaces between the skin of the fuselage and the platform 72, which would be provided with a series of ports to put suction under the sheet 68a.

At 88 at the aft end (FIG. 12) of the external duct structure 62, there is provided a guide vane system which acts to turn and direct the air from the ducts 64 and 66 forwardly into the duct 70. This guide vane system is similar to 90 at the forward end of duct structure 62, see FIG. 14, which can be termed a cascade and consists of a series of curved blades as shown mounted in a supporting frame which is pivotally mounted at 91 so that it can be swung downwardly from a position 90, see FIG. 14, to the position 90a when the duct 62 is collapsed. When cascade 90 is elevated its frame fits snugly against the material of 62; the frame fills the duct. In the case of the cascade 88 the vanes are arranged to close off the duct 64 and 66 when folded flat, to interrupt the supply of compressed by-pass air from the turbofan, which may then be allowed to discharge straight aft in conventional fashion at the nacelles.

Directly beneath the retracted position of the cascade 90a (FIG. 14) and starting with the rectangular cross-section 92 (FIG. 19) is a solid, bifurcated duct system lying entirely within the fuselage and dividing the air that descends vertically from the cascade 90 when erected. This solid duct system branches at once into the two ducts 94 and 96, which bend and twist to terminate at rectangular sections 132 and 140 (FIGS. 13, 14). Immediately prior to terminating, ducts 94 and 96 have a curving rectangular section and contain the cascades 98 and 100, the purpose of which is to turn the air efficiently into a horizontal direction. Twist in the ducts 94 and 96 directs the air slightly aft, in view of the swept wing. The terminal station of the rigid duct installation is shown at 132 in FIG. 21.

Extending along the undersurface of the wings 54 and 56 are the distensible duct sheets 101 and 102 which are illustrated in greater detail in FIGS. 15, 16 and 17, for the wing 56. The details for this construction also apply for the duct sheet 101 of wing 54. The sheet 102 is secured along one edge of the undersurface of the wing by means of the strip 106 to form an airtight joint and the sheet is tapered and sealed to close the wing tip end, as clearly shown in FIG. 17. When distended this sheet forms a duct 104, see FIG. 15. The other edge of the sheet is connected by an airtight joint at 108 to the edge of a plate 110 which is hingedly mounted at 112 along and somewhat forward of the flap. The plate can be drawn into position 110a by means of a cable 114, in this example, which extends to a winch, not shown.

When the flap 126 is lowered, i.e., when air is put into the duct system by erecting the cascades 88 (FIG. 12) and 90, the cable 114 is released and the filling duct 104 rotates plate 110 from position 110a to 110. When the flap is raised, the cascades 88 and 90 simultaneously are lowered, shutting off the by-pass air from the turbofan engines, and an actuating force in cable 114 rotates the plate 110 to a position 110b, at which the material of the duct sheet 102 is just taut. Final rotation of 110 to retracted position 110a then serves to put a little stretch in the material, whether rubber sheet with molded-in spanwise steel wires or metal sheet with piano hinge joints at 106 and 108. This final stretch will insure a perfectly smooth, unwrinkled surface for cruising flight, and is possible because of the convexity of the airfoil lower surface.

In the example illustrated the undersection of the wing is transversely curved, shown at 116, to form the upper surface of the blowing slot nozzle. The undersurface of the nozzle is formed by a metal wall 118 extending from the hinge 112 to terminate at the trailing edge of the cove or wing proper. There is thus formed a blowing nozzle 124 extending along the rear edge of the wing cove. As in the case of the nozzle for the propeller blade, a series of separators 120 are mounted within the wing extending from the wing rear beam 122 to the metal wall 119, as shown. These separators 120 support the box structure bounded by 118 and 119, which in turn supports the hinge 112. The wing flap 126 is supported along the aft edge of the wing on the brackets 128 which attach to the wing beam in the usual manner. It is noted that the nozzle 124 discharges so as to impinge on the top of the nose of the flap 126.

It is intended that with this arrangement the duct 104 is only inflated when the flap 126 is lowered 30 degrees or more, as in the case of take-off, landing and slow speed flight. The flap then becomes a jet flap having in effect a chord much greater than the physical chord. The effect of the distended duct on the areodynamic characteristics of the jet flapped wing is likely to be entirely negligible. The dynamic pressure of the external flow is sufficiently low in all cases when the jet flap is operating that the internal duct pressure will positively maintain the shape of the duct 104. When the flap is raised the supply of compressed air to the duct 104 is cut off and the sheet 102 is drawn to the position 102a as previously explained.

A simpler arrangement to secure the same result is illustrated in FIG. 16, where the same parts are given the same reference characters. In this case, however, the aft edge of the sheet 102 is attached to the flap 126, as indicated, at 108a. The bottom half of the nozzle assembly is formed by a special suitably shaped member 118a to replace the surface 118 of FIG. 15. In any event, the nozzle 124 is again formed and positioned as in FIG. 15 relative to the nose of the flap 126. These parts are proportioned so that when the flap is raised to normal position, as in normal flight, as shown at 126a, the sheet 102 will be drawn taut against the undersurfaces of the wing and the flap. The sheet 102 will not interfere with the raising of the flap (if used as an aileron) above neutral position, for example, to a position 126b, if the sheet is of rubber or other stretchable material and the flap (or aileron) is power actuated.

In landing a jet wing airplane, immediately upon touchdown it might prove advantageous to increase the flap angle to something like 100 degrees, as shown at 126c, so that the jet sheet of blowing air adhering to the back of flap 126c will leave the trailing edge with a forward component of velocity. Some reverse thrust will thus be produced, helpful in decelerating the aircraft.

The sides of the fuselage where the distensible wing ducts 104 emerge are cut away, as shown at 134, see FIG. 14, to provide room for the distended sheets 101 and 102. When the ducts are folded flat, these openings are closed by means of cover plates 150 which can be mounted and power operated by mechanism, not shown, to close the openings in the fuselage. Sheet 102 connects to the rigid duct end 132 somewhat inboard the side of the fuselage (FIG. 21). Sheet 101 similarly connects to duct end 140.

It is noted that the plates 110 are tapered down at the ends to a point as indicated at 112a in FIG. 21, so that when the sheets 102 and 101 are drawn flat in deflated position they will be taut throughout their length.

The cascades 88 and 90 are pivotally supported at 91 in the case of the cascade 90, so that when it is folded down to horizontal position the plates 76, 77 and 79 can be folded outwardly as previously explained to draw the sheet 68 taut across the top of the fuselage, with the result that all the parts are within its contour. This involves a plate 128, see FIG. 14, forming one side of the vertical main duct 92, which is hinged to collapse under the cascade 90a, FIG. 14, when the cascade is lowered, to permit encompassing the parts within the outline of the fuselage. These features involve simple mechanical arrangements which anyone skilled in the art can provide in the light of the objectives of this invention.

The result of the construction illustrated in FIGS. 12 to 21 inclusive is that a collapsible duct system extends from an aft position adjacent the turboengine nacelles 58 and 60 forwardly to and in connection with the collapsible duct system on the undersurfaces of the wings, so that air under pressure can be supplied to the flap slots 124 when desired. The duct system includes cascade and shut-off assemblies 88 and 90, and cascade assemblies 98 and 100 for directing the compressed air most efficiently to the wing nozzles 124.

It is to be emphasized that the heart of this invention is the external distensible air duct, chiefly, that running spanwise along the undersurface of a wing (FIGS. 13, 15) to supply a blowing slot, but also one running fore and aft on the top, bottom or sides of a fuselage, as in FIGS. 18 and 19. How the air passes from the compressor or fan into the duct, and how the air passes from the fuselage duct, in the case of the wing blowing system, to the wing duct, will vary from one airplane to another. For example, FIGS. 14 and 19 merely show one way in which, for a high-wing aircraft, the fuselage duct might be connected to the wing ducts. In the case of a low-wing airplane the fuselage duct would be on the belly of the fuselage and a much simpler union could be effected. The connection of the air source to the duct, whether a fuselage or wing duct, will depend on the power plant or compressor used, and, of course, on its location. It might be pod-mounted from the wing, or wing tip mounted.

There is an essential difference in duct materials for the airplane (wing and fuselage) application and the propeller application. In the case of the airplane, as FIGS. 15 and 18 show, practically no stretch is necessary for the materials of 102 and 62. Flexible sheet metal could be used for these sheets with a sealed piano hinge or other flexible material providing the attachment to the actuator plates 110 and 76. A rubber or air-impervious fabric with a slight amount of stretch in the chordwise or acrossship directions would also be satisfactory, but would have to incorporate means to prevent other than very slight elongation spanwise or along the fuselage. In the case of the propeller blade, however, there is no actuator plate corresponding to 110 and 76. On the propeller blade any kind of hinged flap is undesirable. Therefore the duct material 26 (FIGS. 1, 8) must possess an elongation of some 30 or 40%, as for example a type of rubber. Again, however, as previously pointed out, there must not be any appreciable elongation radially, and to that end radial wires would be molded into the rubber sheet and clamped to the blade at the outboard end to the flange coupling 13.

There is no intent in this invention that the external distensible wing ducts of FIG. 13 must be used in conjunction with external distensible fuselage ducts. Rigid ducts within the aircraft, especially within the fuselage may be very easily arranged. On thin wings, however, it is very difficult to find adequate cross-section within the profile for air ducts. It is this fact in conjunction with increasing necessity to use thin wings as airplane speeds go up that makes the external distensible wing duct of FIG. 15 (or FIG. 16) of considerable value. There is no intent, either that the propeller duct be used necessarily in conjunction with the wing or fuselage ducts.

As those skilled in the art will appreciate the exact details of the duct system for transferring air under suitable pressure from the power plant of the vehicle will of course vary, depending upon the type of power plant used in the vehicle construction. One system of this type is diagrammatically illustrated in FIGS. 12, 22 and 23. For those skilled in the art the particular example is a diagrammatic representation of a Bristol Siddeley BS 53 turfofan power plant. This power plant is shown in the figures as enclosed within an engine nacelle and the turbofan is diagrammatically illustrated at TF. Associated with the fan are air duct housings 500, each provided with a pair of hingedly mounted doors 502 opening into the air supply duct 64. On the related wall of the housing 500 are another pair of hingedly mounted doors 504 which open outwardly on an axis at right angles to the axes of the doors 502, see FIG. 23. These sets of doors can be power operated simultaneously by means of any suitable form of motive device, not shown, so that for example when the doors 502 open the doors 504 will close and vice versa. Mounted in the housing 500 are diverter cascades or lourve systems which are rotatably mounted on vertical shafts, as shown, so that in one position the by-pass air supplied by the turbofan will be directed as shown in FIG. 22 through the open doors 502 into the duct 64. When the doors 502 are closed and the doors 504 are open, the diverter cascades 506 will be rotated 90° to direct the by-pass air aft of the aircraft in the example illustrated to add to the overall forward thrust of the power plants.

The air from the duct 64 is transferred into a crossplane duct 64a which is connected to the vertical duct 64b. It will be noted, as will be apparent, that the arrangement on the other side of the fuselage for the opposite power plant is the same so that the by-pass air from both turbofans is delivered to the vertical duct 64b which fits into the cascade or guide fan system 88 which directs the air forwardly into the duct 70 provided by a distensible sheet 68. When the doors 502 are closed and the doors 504 are simultaneously opened the by-pass air from the turbofan TF will be discharged aft, see FIG. 23. In order to efficiently direct the air either out through the doors 502 or out through the doors 504, the cascades 506 are rotated 90° to guide the air in the desired directions. These cascades are refinements in the sense that the air could be directed in an operative sense when the respective doors are opened and closed without their use. During cruising when the distensible ducts are collapsed the doors 502 being closed prevent the creation of a suction on the duct system for the distensible ducts.

It will be apparent, of course, that the duct systems for distensible ducts be they on the propellers or on the wings, or both, simply provide guideways for directing air under pressure to the proper points efficiently without interfering with the airfoil surfaces of the aircraft in normal flight, thickening them, or interfering with their internal structure or staves.

In view of the above description it will be apparent to those skilled in the art that the subject matter of this invention is capable of considerable variation in its detail and it is intended, therefore, that the particular embodiments of the invention herein disclosed are provided in an exemplary sense without intending to limit the application of the invention to these specific forms. It is preferred that the scope of the invention be determined by the appended claims.

What is claimed is:

1. In an aircraft the combination comprising a member having external surfaces including at least one airfoil surface, means forming a blowing nozzle positioned to discharge along the trailing edge of said airfoil surface, a power operated source of compressed fluid on the aircraft, and a collapsible duct supported on the exterior surface of said member and connecting said source with said nozzle means, said duct when distended modifying the airfoil contour and said member including a fuselage and a wing, said collapsible duct having a section extending along said fuselage and a section extending along the undersurface of said wing.

2. In an aircraft the combination comprising a member having external surfaces including at least one airfoil surface, means forming a blowing nozzle positioned to discharge along the trailing edge of said airfoil surface, a power operated source of compressed fluid on the aircraft, and a collapsible duct supported on the exterior surface of said member and connecting said source with said nozzle means, said duct when distended modifying the airfoil contour and said collapsible duct including a flexible sheet, means for supportnig said sheet along the top of the fuselage of the aircraft so as to hold it taut on the upper surface thereof, and means for raising said sheet from said surface to form a duct.

References Cited in the file of this patent

UNITED STATES PATENTS

| 2,328,079 | Goodman | Aug. 31, 1943 |
| 2,378,528 | Arsandaux | June 19, 1945 |
| 2,918,978 | Fanti | Dec. 29, 1959 |
| 3,018,982 | Multhopp | Jan. 30, 1962 |

FOREIGN PATENTS

| 838,209 | France | Nov. 28, 1938 |
| 1,239,330 | France | July 18, 1960 |
| 617,058 | Germany | Aug. 10, 1935 |